US012792326B2

(12) United States Patent
Mishra et al.

(10) Patent No.: US 12,792,326 B2
(45) Date of Patent: Nov. 10, 2026

(54) MICROARCHITECTURAL-NEUTRAL AUTOMATIC TYPE AND SHAPE INFERENCE AND CROSS-MICROARCHITECTURE INVOCATION

(71) Applicant: Hewlett Packard Enterprise Development LP, Spring, TX (US)

(72) Inventors: Alok Mishra, Edison, NJ (US); Hongzheng Tian, Irvine, CA (US); Rolando Pablo Hong Enriquez, Bicester (GB); Mateusz Piotr Dziubinski, Minneapolis, MN (US); Xin Zhan, Sugar Land, TX (US); Dejan S. Milojicic, Palo Alto, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 246 days.

(21) Appl. No.: 18/678,875

(22) Filed: May 30, 2024

(65) Prior Publication Data

US 2025/0370738 A1 Dec. 4, 2025

(51) Int. Cl.

*G06F 8/41* (2018.01)
*G06F 8/73* (2018.01)
*G06F 15/78* (2006.01)

(52) U.S. Cl.

CPC ................ *G06F 8/447* (2013.01); *G06F 8/73* (2013.01); *G06F 15/7807* (2013.01)

(58) Field of Classification Search

CPC ......... G06F 8/443; G06F 8/73; G06F 15/7807
See application file for complete search history.

(56) References Cited

U.S. PATENT DOCUMENTS

| | | | | |
|---|---|---|---|---|
| 7,146,606 | B2 * | 12/2006 | Mitchell | 717/141 |
| 7,559,050 | B2 * | 7/2009 | Burger | G06F 8/20 717/106 |
| 8,108,842 | B2 * | 1/2012 | Brown | G06F 9/45516 717/136 |
| 8,117,604 | B2 * | 2/2012 | Archambault | G06F 8/443 717/147 |
| 8,539,463 | B2 * | 9/2013 | De | G06F 8/427 717/146 |
| 10,140,099 | B2 * | 11/2018 | Kintali | G06F 30/331 |
| 10,338,902 | B1 * | 7/2019 | Sevigny | G06F 8/53 |
| 10,372,431 | B2 * | 8/2019 | Munshi | G06F 8/456 |

(Continued)

*Primary Examiner* — Douglas M Slachta
(74) *Attorney, Agent, or Firm* — Slater Matsil, LLP

(57) ABSTRACT

In certain examples, a method includes receiving, at a compiler frontend, program code for execution on a computing device; generating, by an AST generator of the compiler frontend, an AST based on the program code; generating, by an IR generator of the compiler frontend, an initial IR based on the AST; analyzing the initial IR to infer type and shape information for the initial IR; adding the type and shape information to the initial IR to obtain an updated initial IR; generating, by a multi-level IR (MLIR) generator, a high level dialect IR based on the updated initial IR; generating one or more graph-level dialect IRs based on the high level dialect IR; generating one or more hardware type specific dialect IRs based on the one or more graph-level dialect IRs; and generating executable code for one or more processor architecture types based on the hardware type specific dialect IRs.

20 Claims, 5 Drawing Sheets

(56) References Cited

U.S. PATENT DOCUMENTS

| | | | | |
|---|---|---|---|---|
| 10,416,999 | B2 * | 9/2019 | Fleming | G06F 13/4221 |
| 11,347,488 | B2 * | 5/2022 | Guo | G06F 8/47 |
| 11,593,540 | B1 * | 2/2023 | Popovici | G06F 9/455 |
| 12,474,908 | B2 * | 11/2025 | Shajii | G06F 8/443 |
| 2007/0294512 | A1 * | 12/2007 | Crutchfield | G06F 8/443 712/E9.033 |
| 2007/0294665 | A1 * | 12/2007 | Papakipos | G06F 8/45 717/119 |
| 2011/0154307 | A1 * | 6/2011 | Upton | G06T 15/005 717/146 |
| 2024/0135076 | A1 * | 4/2024 | Cheng | G06F 30/327 |
| 2025/0130784 | A1 * | 4/2025 | Diwale | G06F 8/456 |
| 2025/0328325 | A1 * | 10/2025 | Ferro | G06F 8/443 |

* cited by examiner

MICROARCHITECTURAL-NEUTRAL AUTOMATIC TYPE AND SHAPE INFERENCE AND CROSS-MICROARCHITECTURE INVOCATION

BACKGROUND

Computer programs may be written for execution on computing devices. Such computing devices may include a heterogeneous set of processor components on which the computer program may execute. Computer programs may not be written to take advantage of the heterogeneous processor components of a computing device, such as, for example, accelerated execution using certain processors instead of other processors.

BRIEF DESCRIPTION OF THE DRAWINGS

Certain examples discussed herein will be described with reference to the accompanying drawings listed below. However, the accompanying drawings illustrate only certain aspects or implementations of examples described herein by way of example, and are not meant to limit the scope of the claims.

Figure 1:
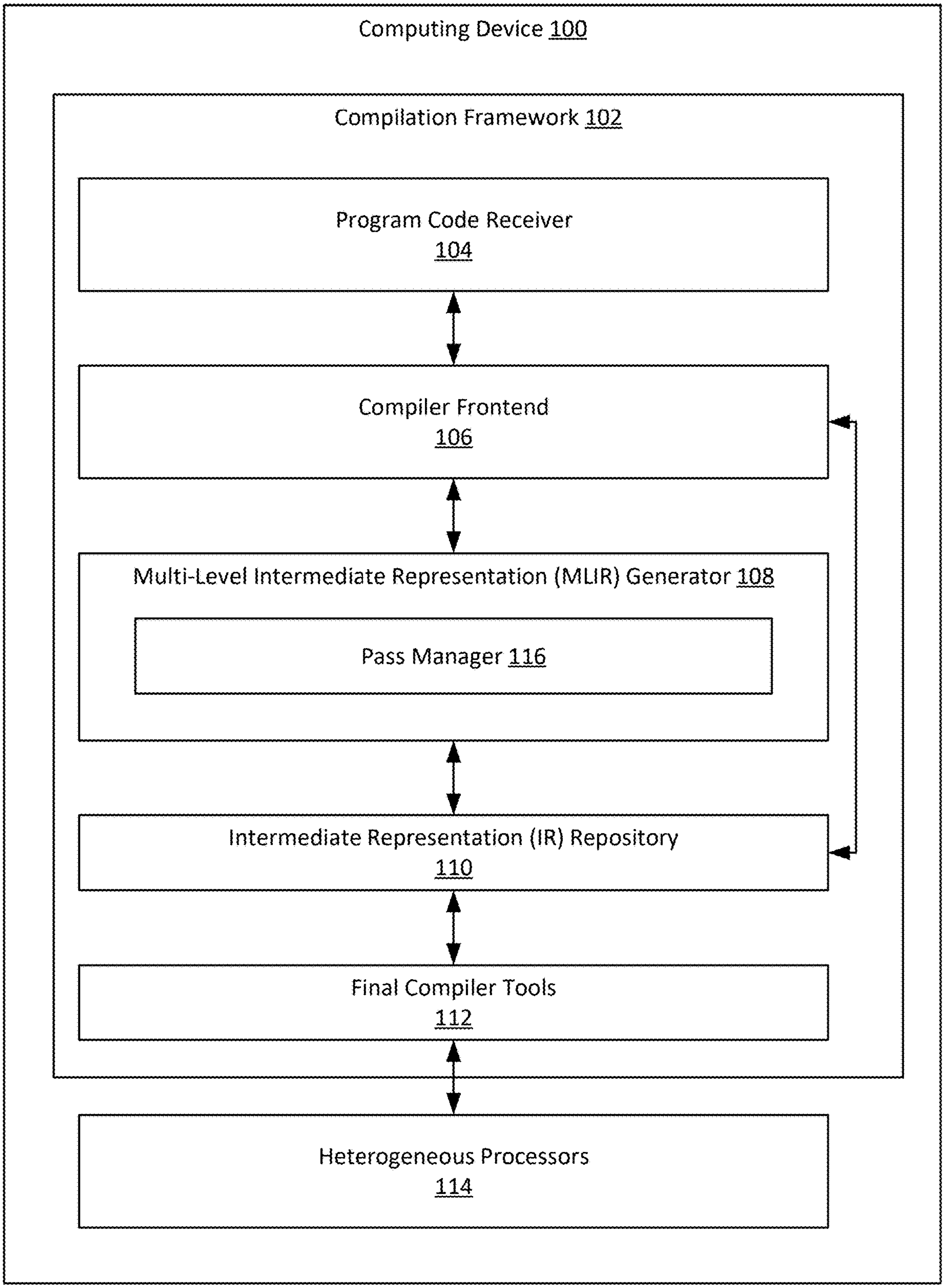
FIG. 1 illustrates a block diagram of an example system in which a compiler framework may be implemented in accordance with one or more examples disclosed herein.

The figures are drawn to illustrate various aspects of the disclosure and are not necessarily drawn to scale.

DESCRIPTION

Computer programs are generally written in programming languages, such as, for example, Python. Such computer programs may be intended to execute using hardware processor components, such as, for example, central processing units (CPUs), graphics processing units (GPUs), quantum processing units (QPUs), field-programmable gate arrays (FPGAs), and/or any other type of processor that may be used to execute, at least in part, a computer program. However, execution on at least some types of processors may require type and shape information for arguments in functions of a computer program to be present. Additionally, to execute a program on a particular type of processor, a programmer, when writing the code, may have to write code differently so that the code executes properly on the intended processor. Also, in some scenarios, it may be advantageous for a program to be executed using different types of processors (e.g., a program executes on a CPU, but certain functions therein are accelerated via execution using a GPU or FPGA). Such cross-architecture execution of a program may require the programmer to write code differently for execution on the various processor types, and write additional portions of the program to address the switches between processor types during execution.

In order to address, at least in part, the aforementioned challenges, examples described herein include techniques for implementing a compilation framework that may be provided with program code, infer type and shape information for arguments of functions in the program code, and compile the program code for execution on a variety of processor architectures. Thus, in one or more examples, a programmer need not specifically annotate the program code to indicate type and shape information. Also, in one or more examples, instead of having to write portions of the program code separately for execution on different processor architectures, using the compilation framework described herein, a programmer need only provide a simple annotation (e.g., (mode='cgen, gpu'), (mode=cgen, fpga), (mode='cgen, gpu)) in the program code to cause the compiler framework to compile the code portion for execution on the specified processor architecture type. Therefore, the compiler framework disclosed herein may allow a programmer to write a program once, and with simple annotations related to processor type, have the program code efficiently execute using a variety of processor architectures, rather than having to write completely different pieces of code for execution on different processor types.

In one or more examples, the compiler framework may include a compiler frontend, a multi-level intermediate representation (MLIR) generator, and a pass manager (which may be part of the MLIR generator). The compiler front end may include an abstract syntax tree (AST) generator, an intermediate representation (IR) generator, and a type and shape analyzer.

In one or more examples, the compiler framework receives program code to be executed using various processor architecture types. The program code may be written, for example, by a programmer, and may include simple annotations therein that indicate that certain portions of the program code are to be executed using specified processor architecture types. As an example, the program code may be intended for execution on a computing device that includes one or more CPUs, one or more GPUs, and one or more FPGAs. Thus, a programmer may annotate the program code with simple annotations that indicate that the program code is to be executed on a CPU, except for certain functions, some of which may be annotated to indicate execution using a GPU, and others of which are annotated to indicate execution on an FPGA. Such annotations may be nested. For example, a certain portion of the program code may be annotated for execution on a CPU, which may include a function that is annotated for execution on a GPU, and the function to be executed on the GPU may further include a function annotated to be executed using an FPGA. Such execution using various processor architecture types may be referred to as cross-microarchitecture invocation within the program code.

In one or more examples, the compiler frontend may first generate an abstract syntax tree (AST) based on the program code. In one or more examples, an AST is a tree representation of the structure of the program, with nodes of the tree representing constructs (e.g., functions, arguments, and the like) in the program code. In one or more examples, the IR generator of the compiler frontend then generates an initial IR of the program code based on the AST of the program code. As an example, a program written in the Python programming language may first have a Python AST generated by the AST generator of the compiler frontend, and then a PyLog IR may be generated based on the Python AST.

In one or more examples, the type and shape analyzer of the compiler frontend may then analyze the IR to infer type (e.g., floating point, integer, string, Boolean, character, string, and the like) and shape information (e.g., information related to the structure and/or properties of an element, object, and the like), which may be added to the IR. As an example, type and shape information may not be explicitly set forth in the program code. Thus, the type and shape analyzer may analyze arguments within the program code to infer the type and shape of the arguments. For example, a function may multiply matrices, and the matrices to be multiplied may be analyzed to infer the number of rows and columns (e.g., the shape) and the type of the elements of the matrices (e.g., floating point numbers). In one or more examples, the type and shape are thus inferred from the context relevant to a node of the initial IR. In one or more examples, if the type and shape cannot be inferred from the context of a node of the initial IR, then the type inference analyzer may analyze the parent node(s) to infer the type and shape information. As an example, the result of a matrix multiplication function may not have a context that allows for type and shape inference, but an analysis of the parent nodes that reference the matrices to be multiplied may yield how n rows and columns (e.g., the shape) the resulting matrix will have, as well as the type of the elements therein (e.g., multiplying two matrices with floating point elements will result in a matric of floating point elements).

In one or more examples, the initial IR (e.g., a PyLog IR) is provided to a multi-level intermediate representation (MLIR) generator of the compilation framework. In one or more examples, the MLIR generator first generates a high level dialect based on the IR generated by the compiler frontend. In one or more examples, the high level dialect has a high level of abstraction such that it is readable (e.g., human-readable), and hardware agnostic, as it is devoid of any lower-level hardware specifics. In one or more examples, the high level dialect representation of the program code is then provided to the pass manager of the MLIR generator of the compilation framework.

In one or more examples, the pass manager is responsible for a process of lowering the high level dialect initially generated by the MLIR generator into successively lower level MLIR dialects in a series of passes, which successively translate and/or transform the high level dialect MLIR representation of the program code into a set of successively lower level dialects that are closer to being in a form executable by hardware (e.g., CPUs GPUs, QPUs, FPGAs). In one or more examples, the first pass is to lower the high level dialect representation of the program code into intermediate dialects, which may be referred to as graph-level dialects. In one or more examples, a graph-level dialect is a more standard MLIR dialect that includes groupings of operation types. As such, operations represented in the high level dialect may be lowered into corresponding operations that are in graph-level dialects. In one or more examples, the graph-level dialects are still generally hardware agnostic.

In one or more examples, once the program code has been transformed into an AST, then an initial IR, then an IR with inferred type and shape information added, then into a high level MLIR dialect, and then into graph-level dialects, subsequent lowering passes may be performed by the pass manager to lower the graph-level passes into dialects for specific hardware. As discussed above, the program code may include simple annotations that indicate that a portion of the program code (e.g., a particular function) should be executed using a particular type of processor architecture (e.g., CPU, GPU, QPU, FPGA). Thus, the graph level dialect representations of the program code may be subjected to a lowering pass that generates hardware type specific dialects. Examples include a GPU dialect, a CPU dialect, an FPGA dialect, a QPU dialect, and the like. In one or more examples, such hardware type specific dialects provide a bridge dialect between the aforementioned graph-level dialects and lower level target-specific dialects. Examples of such lower level target-specific dialects include an FPGA dialect, a QPU dialect, and an LLVM dialect. In the term 'LLVM dialect', the portion 'LLVM' was formerly an acronym that stood for 'low level virtual machine', but is now recognized by those of ordinary skill in the art as an orphan initialism rather than an acronym, and refers to the LLVM Project, which is a collection of modular and reusable compiler and toolchain technologies. See, e.g., https://llvm.org/("The LLVM Project is a collection of modular and reusable compiler and toolchain technologies. Despite its name, LLVM has little to do with traditional virtual machines. The name "LLVM" itself is not an acronym; it is the full name of the project. "). As an example, for a portion of the program code that is to be compiled for execution on an FPGA, a graph-level dialect may be transformed into a ScaleHLS dialect, from which a representation of the program code portion may be generated that is executable using an FPGA. As another example, a graph-level dialect may be transformed into a nvgpu dialect from which an LLVM IR may be generated for a Nvidia GPU.

In one or more examples, for at least some non-FPGA hardware components, the hardware type specific dialects may be further lowered into LLVM IR dialects. In one or more examples, a LLVM IR is the lowest level IR generated by the pass manager of the MLIR generator, and may be used in a final compilation step to generate machine code executable on a particular processor architecture type, such as, for example, a CPU or a GPU.

Certain examples in this disclosure may provide techniques for implementing a compiler framework that can accept program code that is not written for specific processor architecture types, but instead merely includes simple annotations that indicate portions of the program code that are intended for execution on various processor architecture types, alleviating the need for the programming code to be rewritten for different processor architecture types. To facilitate such functionality, the compiler framework described herein is configured to infer, as necessary, type and shape information to be included in an initial IR for the program code, which may be used by a MLIR generator, and pass manager therein, to compile the initial IR into a high level MLIR dialect, then into graph-level dialects, and then into hardware type specific dialects, which may be used to generate lower level code for execution on various types of processor architectures. Thus, the compiler framework described herein may shorten development time (as program code need not be rewritten for different processor architectures), hide underlying hardware implementation details from program writers, increase portability and reusability of program code, and allow for execution of program code on computing devices with heterogeneous processor architecture types.

FIG. 1 illustrates a block diagram of an example system in which a compiler framework may be implemented in accordance with one or more examples disclosed herein. As shown in FIG. 1, the system includes a computing device 100. The computing device 100 may include a compiler framework 102 and heterogeneous processors 114. The compiler framework 102 may include a program code receiver 104, a compiler frontend 106, a MLIR generator 108, an IR repository 110, and final compiler tools 112. The MLIR generator may include a pass manager 116. Each of these components is described below.

Figure 5:
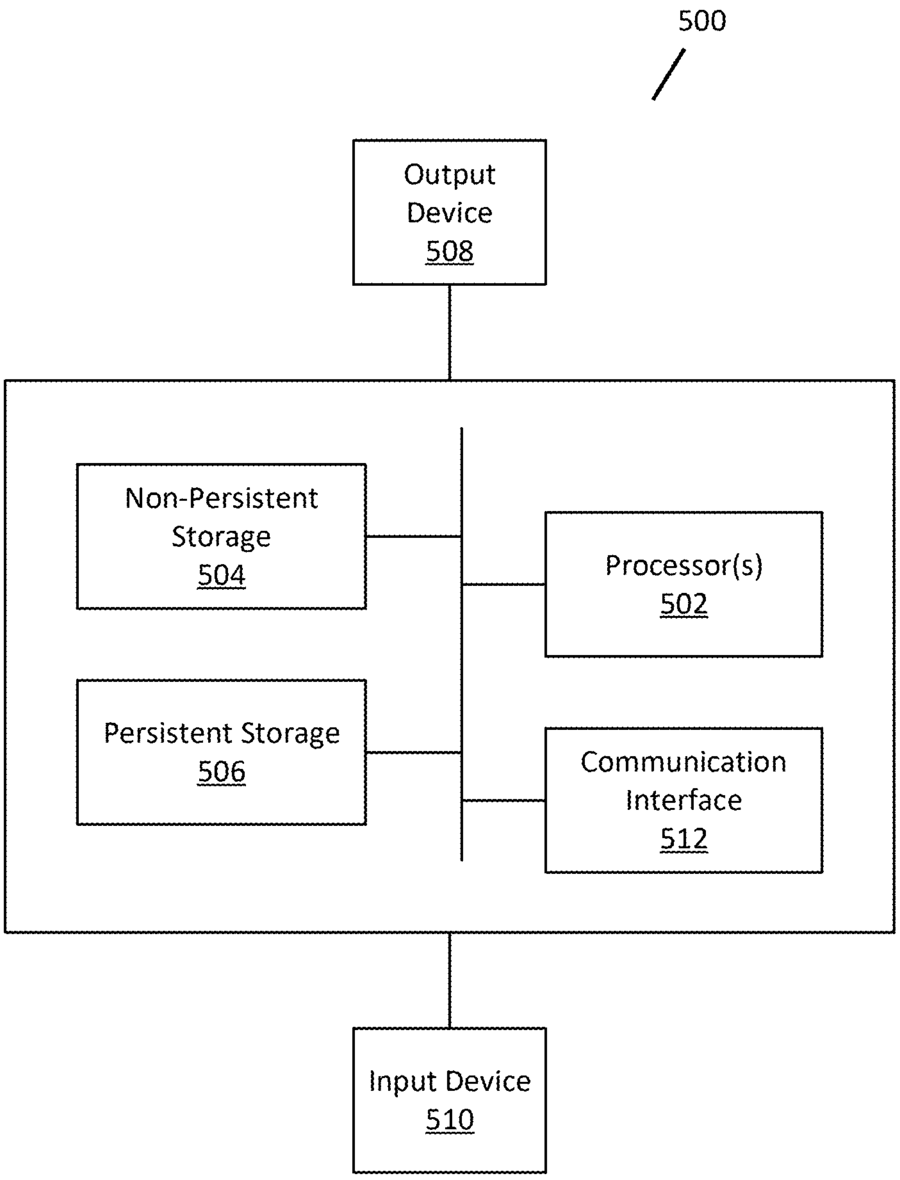
FIG. 5 illustrates a block diagram of a computing device, in accordance with one or more examples disclosed herein.

In one or more examples, as used herein, a computing device (e.g., the computing device 100), may be any single computing device, a set of computing devices, a portion of one or more computing devices, or any other physical, virtual, and/or logical grouping of computing resources. One example of a computing device is shown in FIG. 5, and described below.

Examples of computing devices include, but are not limited to, a server (e.g., a blade-server in a blade-server chassis, a rack server in a rack, a desktop server, any other type of server device), a desktop computer, a mobile device (e.g., laptop computer, smart phone, personal digital assistant, tablet computer, automobile computing system, and/or any other mobile computing device), a storage device (e.g., a disk drive array, a fibre channel storage device, an Internet Small Computer Systems Interface (ISCSI) storage device, a tape storage device, a flash storage array, a network attached storage device, any other type of storage device), a network device (e.g., switch, router, multi-layer switch, any other type of network device), a virtual machine, a virtualized computing environment, a logical container (e.g., for one or more applications), a container pod, an Internet of Things (IoT) device, an array of nodes of computing resources, a supercomputing device, a data center or any portion thereof, and/or any other type of computing device with the aforementioned requirements. As one of ordinary skill in the art will appreciate, any of the aforementioned examples of computing devices necessarily require at least some hardware components. As an example, a virtual machine, a container, and/or a container pod, when considered as a computing device herein, includes the underlying hardware on which the virtual machine, a container, and/or a container pod executes.

In one or more examples, any or all of the aforementioned examples may be combined to create a system of such devices, or may be partitioned into separate logical devices, which may collectively be referred to as a computing device. Other types of computing devices may be used without departing from the scope of examples described herein, such as, for example, the computing device shown in FIG. 5 and described below. The system may include any number and/or type of such computing devices in any arrangement and/or configuration without departing from the scope of examples disclosed herein.

In one or more examples, the storage and/or memory of a computing device (e.g., the computing device 100) or system of computing devices may be and/or include one or more data repositories for storing any number of data structures storing any amount of data (e.g., information). In one or more examples, a data repository is any type of storage unit and/or device (e.g., a file system, database, collection of tables, RAM, hard disk drive, solid state drive, and/or any other storage mechanism or medium) for storing data. Further, the data repository may include multiple different storage units and/or devices. The multiple different storage units and/or devices may or may not be of the same type or located at the same physical location.

In one or more examples, any storage and/or memory of a computing device or system of computing devices, and/or network devices, may be considered, in whole or in part, as non-transitory computer readable mediums storing software and/or firmware, which, when executed by one or more processors, cause the one or more processors to perform operations in accordance with one or more examples disclosed herein.

In one or more examples, the computing device 100 includes the compilation framework 102. In one or more examples, the compilation framework may be any hardware (e.g., circuitry) of the computing device 100, or any combination of such hardware with software and/or firmware of the computing device 100, that is configured to perform any number of operations, actions, and/or any other processing related to compiling computer program code received at or otherwise obtained by the computing device 100.

In one or more examples, the compilation framework 102 includes the program code receiver 104. In one or more examples, the program code receiver 104 may be any hardware (e.g., circuitry) of the computing device 100, or any combination of such hardware with software and/or firmware of the computing device 100, that is configured to receive and/or otherwise obtain computer program code. In one or more examples, computer program code is any code, written in any programming language, that is intended to be executed by a computing device. As an example, computer program code may be written in the Python programming language. Computer program code may be written in any other programming language without departing from the scope of examples disclosed herein (e.g., C, C++, Fortran, and the like). In one or more examples, the program code receiver 104 may be provided program code from an entity that wrote the program code (e.g., a developer, a code generation algorithm device, and the like). In one or more examples, the code is loaded into storage or memory of the computing device 100, received over a network, or received or obtained using any other suitable technique for receiving program code at the program code receiver 104.

In one or more examples, program code received at or otherwise obtained by the program code receiver 104 may include simple annotations therein that indicate that portions of the program code should be compiled for execution on particular processor types. As an example, certain functions within the program code may include simple annotations that indicate that the functions are to be executed on a GPU, an FPGA, or a QPU, while the remainder of the program code is to be executed using a CPU. Any combination of heterogeneous processor types may be used to execute program code without departing from the scope of examples described herein. As such, any program code received at or otherwise obtained by the program code receiver 104 may include any number of simple annotations indicating a preferred processor type for executing any one or more portions of the program code.

In one or more examples, the compiler framework 102 includes a compiler frontend 106. In one or more examples, the compiler frontend may be any hardware (e.g., circuitry) of the computing device 100, or any combination of such hardware with software and/or firmware of the computing device 100, that is configured to perform various operations as initial steps towards compiling program code for execution by one or more processor types. In one or more examples, the compiler frontend 106 is operatively connected to the program code receiver 104, and may be provided or otherwise obtain program code from the program code receiver 104 to begin compilation of the program code. The compiler frontend 106 may be configured to transform program code into an AST, transform an AST into an initial IR, and/or add type and shape information to an initial IR. An example compiler frontend is discussed further in the description of FIG. 2, below.

In one or more examples, the compiler framework 102 includes the MLIR generator 108. In one or more examples, the MLIR generator may be any hardware (e.g., circuitry) of the computing device 100, or any combination of such hardware with software and/or firmware of the computing device 100, that is configured to receive an initial IR with type and shape information from the compiler frontend 106, and to generate any number of successive IRs (which may also be referred to as dialects) of the program code or various portions therein. As such, the MLIR generator 108 may be operatively connected to the compiler frontend 106 and may receive an initial IR with type and shape information added from the compiler frontend 106. In one or more examples, the MLIR generator is configured to generate a high level IR based on the initial IR from the compiler frontend 106. In one or more examples, the high level dialect has a high level of abstraction such that it is readable (e.g., human-readable), and hardware agnostic, as it is devoid of any lower-level hardware specifics.

In one or more examples, the MLIR generator 108 may then provide the high level IR to a pass manager 116 of the MLIR generator. In one or more examples, the pass manager 116 is responsible for a process of lowering the high level IR initially generated by the MLIR generator 108 into successively lower level MLIR dialects in a series of passes, which successively translate and/or transform the high level dialect MLIR representation of the program code into a set of successively lower level dialects that are closer to being in a form executable by hardware (e.g., CPUs GPUs, QPUs, FPGAs).

In one or more examples, the first pass is to lower the high level dialect representation of the program code into intermediate dialects, which may be referred to as graph-level dialects. In one or more examples, a graph-level dialect is a more standard MLIR dialect that includes groupings of operation types (e.g., arithmetic ('arith'), linear algebra ('linalg'), tensor operator set architecture (tosa), and the like). As such, operations represented in the high level dialect may be lowered into corresponding operations that are in graph-level dialects. In one or more examples, the graph-level dialects are still generally hardware agnostic.

In one or more examples, subsequent lowering passes may be performed by the pass manager to lower the graph-level passes into dialects for intended for specific hardware types (e.g., processor types). As discussed above, the program code may include simple annotations that indicate that a portion of the program code (e.g., a particular function) should be executed using a particular type of processor architecture (e.g., CPU, GPU, QPU, FPGA). Thus, the graph level dialect representations of the program code may be subjected to a lowering pass that generates hardware type specific dialects. Examples include a GPU dialect, a CPU dialect, an FPGA dialect, a QPU dialect, and the like. In one or more examples, such hardware type specific dialects provide a bride dialect between the aforementioned graph-level dialects and lower level target-specific dialects (e.g., an LLVM dialect for particular CPUs or GPUs). As an example, for a portion of the program code that is to be compiled for execution on an FPGA, a graph-level dialect may be transformed into a ScaleHLS dialect, from which a representation of the program code portion may be generated that is executable using an FPGA. As another example, a graph-level dialect may be transformed into a nvgpu dialect from which an LLVM IR may be generated for a Nvidia GPU. As another example, a graph-level dialect may be transformed into a QPU dialect from which a quantum IR (QIR) may be generated for a QPU.

In one or more examples, the compilation framework 102 includes the IR repository 110. In one or more examples, the IR repository 110 is any storage device of any size or type that is configured to store, at least temporarily, any AST, IR, and/or dialect generated by the compiler frontend 106 and/or the MLIR generator 108. As such, the IR repository 110 may be operatively connected to the compiler frontend 106 and the MLIR generator 108. In one or more examples, the IR repository 110 may store, for example, the initial IR generated by an IR generator of the compilation frontend 106, the high level IR generated by the MLIR generator 108, any dialect generated by the MLIR generator, and any final IRs (e.g., LLVM IRs, FPGA IRs, QIRs) that are ready for a final compilation into a form (e.g., machine code) executable on a particular processor type (e.g., CPU, GPU, FPGA, QPU).

In one or more examples, the compilation framework 102 includes the final compiler tools 112. Although the final compilation tools 112 are shown in FIG. 1 as part of the same computing device 100 as other components of the compilation framework 102, in some examples, the final compilation tools 112 may be separate from (e.g., on a different computing device) and operatively connected to the rest of the compiler framework. For example, in certain scenarios, at least a portion of the final compilation tools 112 may execute on a computing device that includes a particular processor type for which a final compilation tool of the final compilation tools 112 is configured to generate executable code. In one or more examples, the final compilation tools 112 are operatively connected to the IR repository 110, so that any IR stored therein may be obtained by the final compilation tools 112 for compilation into executable code on particular processor types. The final compilation tools 112 may include, but are not limited to, one or more compilers that are configured to transform LLVM IRs generated by the MLIR generator 108 into code executable on particular CPUs and/or GPUs, one or more compilers that are configured to transform QIRs generated by the MLIR generator 108 into code executable on particular QPUs, and/or one or more compilers that are configured to transform FPGA IRs generated by the MLIR generator 108 into code executable on particular FPGAS.

In one or more examples, the computing device 100 includes the heterogeneous processors 114. In one or more examples, the heterogeneous processors 114 are a set of one or more processors of any type on which executable code generated by one or more of the final compilation tools may be executed. As an example, the computing device 100 may include one or more CPUs, GPUs, FPGAS, and QPUs. Although FIG. 1 shows the heterogeneous processors 114 as part of the same computing device 100 as the compilation framework 102, all or any portion of the heterogeneous processors 114 may be included in any number of separate computing devices that include one or more of the heterogeneous processors 114. In one or more examples, regardless of the location of the heterogeneous processors 114, the compilation framework 102 may obtain program code written in any programming language (e.g., Python) that includes simple annotations indicating that certain portions of the program code is to be executed on a particular processor type of the heterogeneous processors, and ultimately generate executable code for execution using the heterogeneous processors 114.

While FIG. 1 shows a particular configuration of components, other configurations may be used without departing from the scope of examples described herein. For example, although FIG. 1 shows certain components as part of the same device, any of the components may be grouped in sets of one or more components which may exist and execute as part of any number of separate and operatively connected devices. As another example, a single component may be configured to perform all or any portion of the functionality performed by the components shown in FIG. 1. Accordingly, examples disclosed herein should not be limited to the configuration of components shown in FIG. 1.

Figure 2:
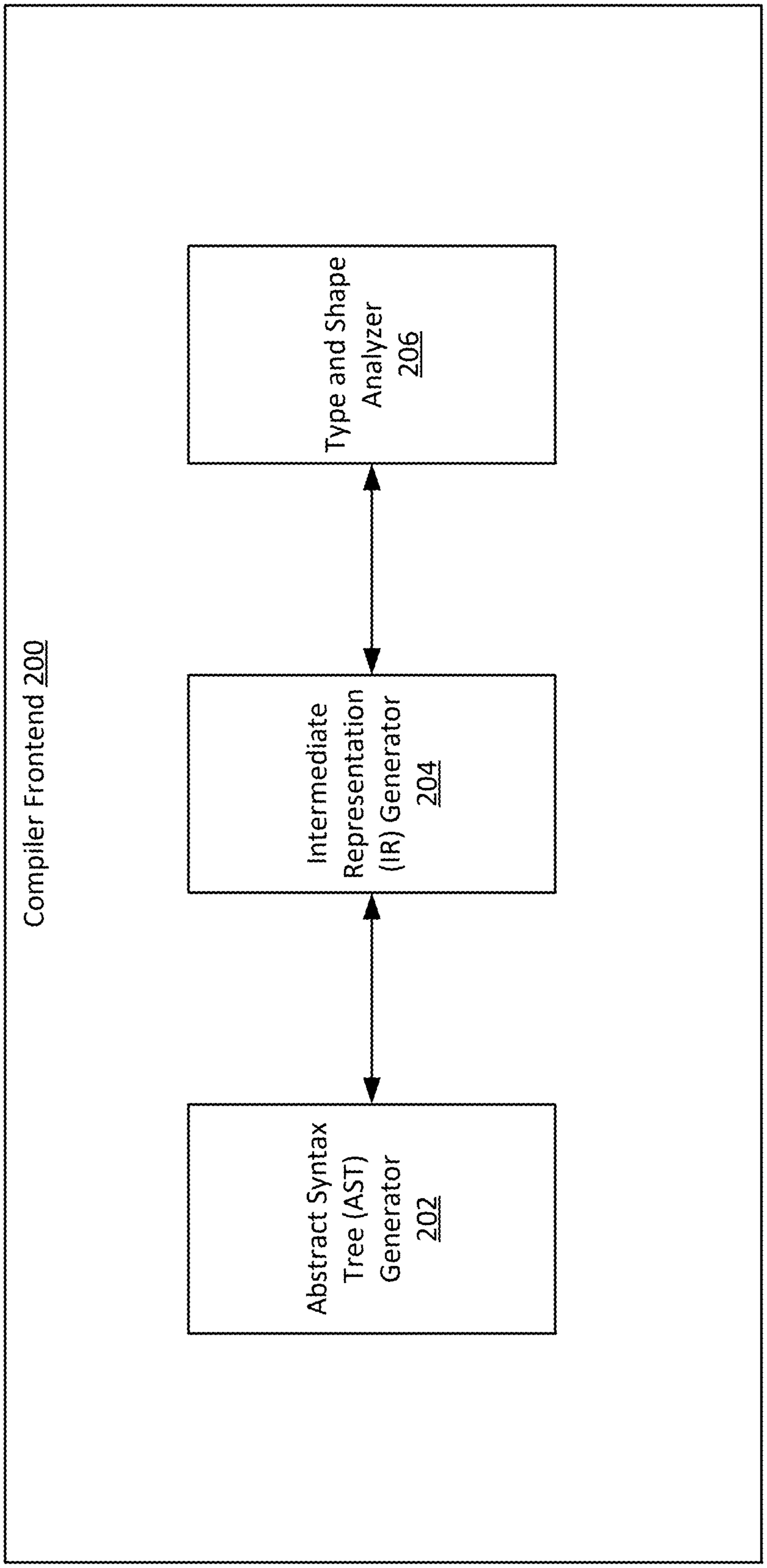
FIG. 2 illustrates a block diagram of an example compiler frontend in accordance with one or more examples disclosed herein.

FIG. 2 illustrates a block diagram of an example compiler frontend in accordance with one or more examples disclosed herein. As shown in FIG. 2, the compiler frontend 200 includes an AST generator 202, and IR generator 204, and a type and shape analyzer 206. Each of these components is described below.

In one or more examples, the compiler frontend 200 is an example of the compiler frontend 106 shown in FIG. 1 and discussed above. As such, the compiler frontend 200 may execute on a computing device (e.g., the computing device 100 of FIG. 1, the computing device 400 of FIG. 4, the computing device 500 of FIG. 5), and be configured to obtain program code (e.g., from the program code receiver 104 of FIG. 1) that includes simple annotations for portions of the program code that is intended for execution on particular processor types (e.g., CPUs, GPUs, FPGAs, QPUs).

In one or more examples, such simple annotations may allow for compilation of different portions of the program code specifically for different processor architecture types, without requiring the entity (e.g., a program code writer) writing the program code to write the code differently for execution on different processor types. As an example, program code may include a simple annotation (e.g., mode='cgen, cpu') that indicates to the compiler framework 102 of FIG. 1 that the program code should be compiled for execution on a CPU. Within the CPU code, there may be a portion that calls a function that includes a simple annotation (e.g., mode='cgen, gpu') that indicates that the particular function should be compiled for execution on a GPU. Additionally, such cross-processor type invocations may be nested. For example, the aforementioned program code to be compiled for execution on a CPU that includes a portion to be compiled for execution on a GPU may further include, in the portion to be compiled for execution on a GPU, a sub-portion that calls another function that includes another simple annotation (e.g., mode='cgen, fpga') that indicates that the sub-portion is to be compiled for execution on a FPGA. Thus, any portion of the program code may, by way of simple annotations in the program code, be compiled differently by the compiler framework 102 of FIG. 1 for execution on different processor types of a set of heterogeneous processors (e.g., 114 of FIG. 1) of one or more computing devices.

In one or more examples, the compiler frontend 200 includes the AST generator 202. The AST generator 202 may be any hardware (e.g., circuitry), or any software and/or firmware executing using such hardware, that is configured to generate an AST based on program code. In one or more examples, an AST is a tree representation of the structure of the program, with nodes of the tree representing constructs (e.g., functions, arguments, and the like) in the program code, and lines between the nodes representing relationships between nodes. In one or more examples, the AST generator 202 may store generated ASTs in a location (e.g., the IR repository 110 of FIG. 1) accessible to other components of the compiler frontend 200.

In one or more examples, the compiler frontend 200 include the IR generator 204. The IR generator 204 may be any hardware (e.g., circuitry), or any software and/or firmware executing using such hardware, that is configured to generate an initial IR based on AST generated by the AST generator 202. In one or more examples, the IR generator 204 generates the initial IR by traversing the AST to generate the IR, which may be a further representation of the program code that includes certain optimizations, eliminates certain redundancies, and the like. In one or more examples, the IR generator 204 may store the initial IR in a location (e.g., the IR repository 110 of FIG. 1) accessible to other components of the compiler frontend 200.

In one or more examples, the compiler frontend 200 includes the type and shape analyzer 206. The type and shape analyzer 206 may be any hardware (e.g., circuitry), or any software and/or firmware executing using such hardware, that is configured to analyze the initial IR generated by the IR generator 204 to add type and shape information thereto. In one or more examples, the type and shape analyzer of the compiler frontend may analyze the IR to infer type (e.g., floating point, integer, string, Boolean, character, string, and the like) and shape information (e.g., information related to the structure and/or properties of an element, object, and the like), which may be added to the IR. As an example, type and shape information may not be explicitly set forth in the program code (e.g., as is often the case with Python code). Thus, the type and shape analyzer 206 may analyze the initial IR to infer the type and shape of the arguments therein. For example, a function may multiply matrices, and the matrices to be multiplied may be analyzed to infer the number of rows and columns (e.g., the shape) and the type of the elements of the matrices (e.g., floating point numbers). In one or more examples, the type and shape are thus inferred from the context relevant to a portion of the initial IR. In one or more examples, if the type and shape cannot be inferred from the context of a portion of the initial IR, then the type inference analyzer may analyze parent portion(s) to infer the type and shape information. As an example, the result of a matrix multiplication function may not have a context that allows for type and shape inference, but an analysis of the parent nodes that reference the matrices to be multiplied may yield how many rows and columns (e.g., the shape) the resulting matrix will have, as well as the type of the elements therein (e.g., multiplying two matrices with floating point elements will result in a matric of floating point elements). In one or more examples, the type and shape information ascertained by the type and shape analyzer 206 may be added to the initial IR to obtain an updated initial IR, which may be stored, for example in a storage location (e.g., the IR repository 110 of FIG. 1) accessible to an MLIR generator (e.g., the MLIR generator 108 of FIG. 1).

While FIG. 2 shows a particular configuration of components, other configurations may be used without departing from the scope of examples described herein. For example, although FIG. 2 shows certain components as part of the same device, any of the components may be grouped in sets of one or more components which may exist and execute as part of any number of separate and operatively connected devices. As another example, a single component may be configured to perform all or any portion of the functionality performed by the components shown in FIG. 2. Accordingly, examples disclosed herein should not be limited to the configuration of components shown in FIG. 2.

Figure 3:
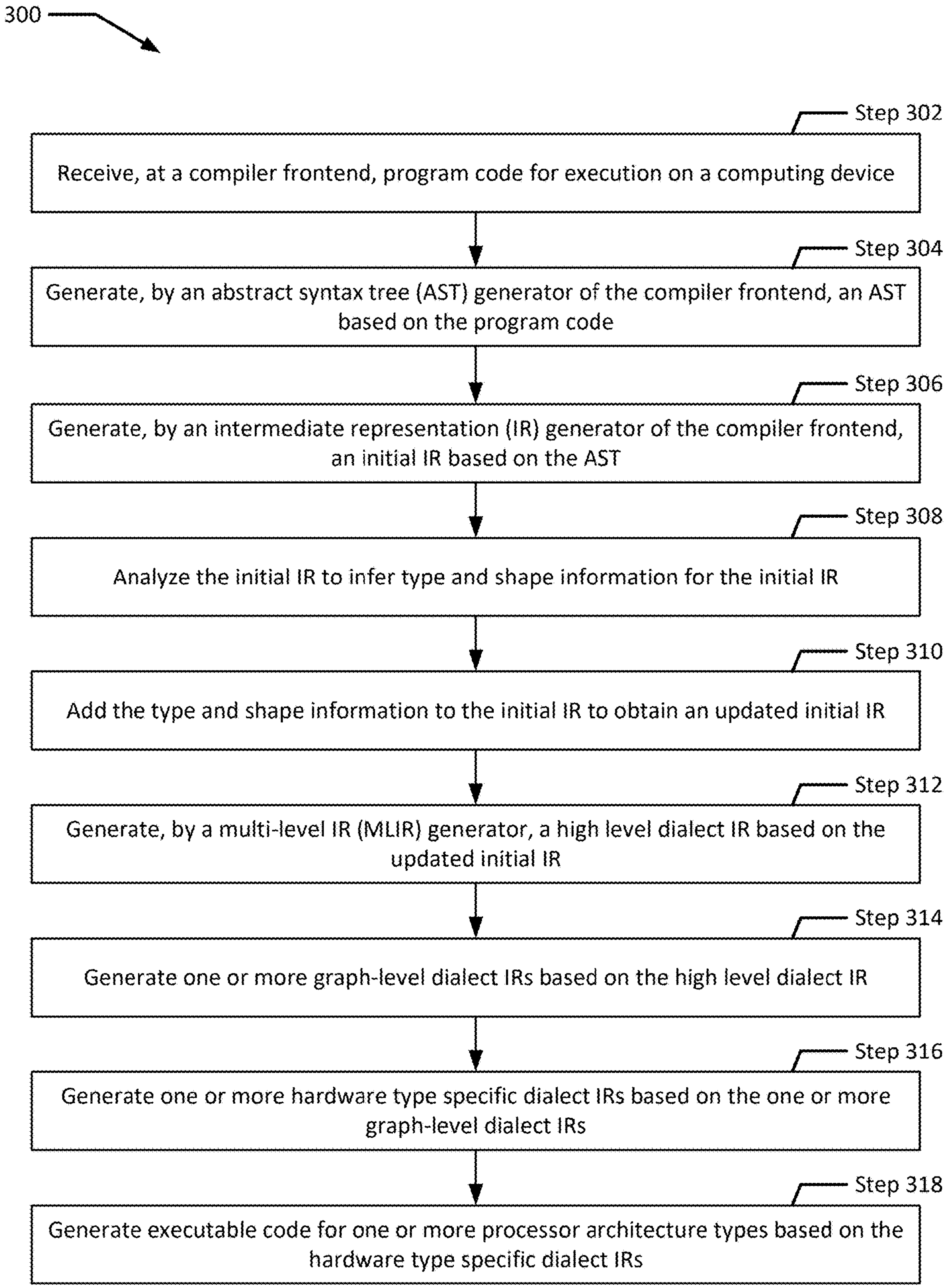
FIG. 3 illustrates an overview of an example method for compilation of program code for execution on heterogeneous processor types in accordance with one or more examples disclosed herein.

FIG. 3 illustrates an overview of an example method 300 for compilation of program code for execution on heterogeneous processor types (e.g., the heterogeneous processors 114 shown in FIG. 1) in accordance with one or more examples disclosed herein. The method may be performed, at least in part, by a computing device (e.g., the computing device 100 shown in FIG. 2, the computing device 400 shown in FIG. 4, the computing device 500 shown in FIG. 5), and/or any one or more components included therein (e.g., the compilation framework 102 of FIG. 1, the program code receiver 104 of FIG. 1, the compiler frontend 106 of FIG. 1, the MLIR generator 108 of FIG. 1, the pass manager 116 of FIG. 1, the final compiler tools 112 of FIG. 1, the compiler frontend 200 of FIG. 2, the AST generator 202 of FIG. 2, the IR generator 204 of FIG. 2, the type and shape analyzer 206 of FIG. 2).

While the various steps in the flowchart shown in FIG. 3 are presented and described sequentially, some or all of the steps may be executed in different orders, some or all of the steps may be combined or omitted, and some or all of the steps may be executed in parallel with other steps of FIG. 3. Accordingly, examples disclosed herein are not limited to the particular set of or order of Steps shown in FIG. 3.

In Step 302, the method 300 includes receiving, at a compiler frontend (e.g., the compiler frontend 106 of FIG. 1, the compiler frontend 200 of FIG. 2), program code for execution on a computing device. As an example, the program code by be received at a program code receiver (e.g., the program code receiver 104 of FIG. 1) and provided to the compiler frontend. The program code may be received from any source without departing from the scope of examples disclosed herein. As discussed above, the program code may be written by any entity capable of writing program code (e.g., a code developer, a program code generation algorithm, and the like), and may include simple annotations that indicate that various portions of the program code are intended for execution on various processor types (e.g., CPU, GPU, FPGA, QPU, and the like).

In Step 304, the method 300 includes generating, by an AST generator (e.g., the AST generator 202 of FIG. 2) of the compiler frontend (e.g., the compiler frontend 106 of FIG. 1, the compiler frontend 200 of FIG. 2), an AST based on the program code. In one or more examples, an AST is a tree representation of the structure of the program, with nodes of the tree representing constructs (e.g., functions, arguments, and the like) in the program code, and lines between the nodes representing relationships between nodes. In one or more examples, the AST generator may analyze and traverse the program code received in Step 302 to generate an AST based thereon.

In Step 306, the method 300 includes generating, by an IR generator of the compiler frontend, an initial IR based on the AST. In one or more examples, the initial IR is generated by traversing the AST generated in Step 304. In one or more examples, the initial IR may be a further representation of the program code that includes certain optimizations, eliminates certain redundancies, and the like. However, the initial IR may not include or only partially include type and shape information. As an example, for certain programming languages (e.g., Python), program code may not include explicit definitions of types and/or shapes for arguments used in the program code. However, type and shape information may be needed for transforming the initial IR into subsequent IRs and/or dialects as the program code is successively lowered into a form that may be compiled for execution on one or more processor types.

In Step 308, the method 300 includes analyzing the initial IR to infer type and shape information for the initial IR. As an example, the type and shape analyzer 206 shown in FIG. 2 may analyze the initial IR generated by the IR generator 204 shown in FIG. 2 to ascertain type and shape information for the initial IR. In one or more examples, analyzing the initial IR may include analyzing the various portions of the initial IR to determine type and shape information for portions of the IR based on context included in the portions of the IR, and/or information ascertained from other portions of the initial IR that are related to a portion of the initial IR being analyzed. As an example, type and shape information may be inferred in context from arguments used in a portion of the initial IR. As another example, when type and shape information cannot be inferred directly from the context of a particular portion of the initial IR, other portions of the initial IR (e.g., portions generated from parent nodes of the AST) may be analyzed to infer type and shape information for the portion of the initial IR.

In Step 310, the method 300 includes adding the type and shape information inferred in Step 308 to the initial IR to obtain an updated initial IR. As an example, the type and shape analyzer 206 of FIG. 2 may add the type and shape information inferred in Step 308 to the initial IR to obtain the updated initial IR. In one or more examples, adding the type and shape information to the initial IR to obtain the updated initial IR includes adding type and shape information within the initial IR in relevant locations so that subsequent analysis of the updated initial IR may be performed to generate additional representations (e.g., IRs, MLIR dialects) of the program code, or portions thereof using the type and shape information, which is often needed as program code is transformed into successively lower IRs and dialects in preparation for final compilation into a form executable by one or more heterogeneous processors.

In Step 312, the method 300 includes generating, by a MLIR generator (e.g., the MLIR generator 108 of FIG. 1), a high level dialect IR based on the updated initial IR. In one or more examples, the high level dialect IR has a high level of abstraction such that it is readable (e.g., human-readable), and hardware agnostic, as it is devoid of any lower-level hardware specifics (e.g., details related to various heterogeneous processor types), and is in a suitable form for subsequent passes by a pass manager of the MLIR generator to transform the high level dialect IR into sets of successively lower IRs of the program code.

In Step 314, the method 300 includes generating one or more graph-level dialect IRs based on the high level dialect IR. As an example, a pass manager (e.g., the pass manager 116 of FIG. 1) of an MLIR generator (e.g., the MLIR generator 108 of FIG. 1) may be provided the high level dialect IR generated in Step 312, and analyze the high level dialect IR to generate any number of graph-level dialect IRs. In one or more examples, the pass manager may analyze the high level dialect IR to determine portions therein that are indicated (e.g., be the aforementioned simple annotations of intended processor type) to be for execution on a particular processor type, and may generate the graph-level dialects based on the analysis. Any number of graph-level dialects may be generated for any number of processor types without departing from the scope of examples discussed herein. As an example, the high level dialect IR may be analyzed to determine that some portions therein are to be executed by a CPU, other portions are to be executed by a GPU, and other portions are to be executed by an FPGA. Based on the results of such an analysis, the pass manager may generate one or more graph-level GPU dialect IRs for portions of the code indicated via simple annotation to be for execution by a GPU, one or more graph-level CPU dialect IRs for portions of the code indicated via simple annotation to be for execution by a CPU, one or more graph-level QPU dialect IRs for portions of the code indicated via simple annotation to be for execution by a QPU, and/or one or more graph-level FPGA dialect IRs for portions of the code indicated via simple annotation to be for execution by a FPGA.

In Step 316, the method 300 includes generating one or more hardware type specific dialect IRs based on the one or more graph-level dialect IRs. In one or more examples, as used herein, a hardware type specific dialect IR is an IR that is in a form that may be used by one or more final compilation tools for transformation into code executable by particular processor types. As an example, any number of LLVM IRs may be generated for portions of the program code to be executed on any number of GPUs and/or CPUs, with particular CPUs and/or GPUs having final compilation tools configured to transform an LLVM IR into executable code for the particular type of CPU and/or GPU to which the final compilation tool corresponds. As another example, quantum dialect IR may be transformed into a QIR that may be used by a final compilation tool for a particular QPU. As another example, a FPGA dialect IR may be transformed into an FPGA IR that may be used by a final compilation tool (e.g., ScaleHLS) for generating code executable on a particular FPGA.

In one or more examples, generating the one or more hardware type specific IRs includes determining that the program code received in Step 302 includes one or more annotations, each specifying a particular processor architecture type (e.g., CPU, GPU, FPGA, QPU) for a corresponding portion of the program code. In one or more examples, the annotations in the program code include specify at least two different processor architecture types (e.g., GPU and FPGA) for different portions of the program code.

In Step 318, the method 300 includes generating executable code for one or more processor architecture types based on the hardware type specific dialect IRs. In one or more examples, any number of final compilation tools may be used to generate executable code corresponding to portions of the program code that are in a form executable by the various processor types of a computing device. As an example, separate final compilation tools may use the various hardware type specific IRs generated in Step 316 to generate executable code for execution on CPUs, GPUS, QPUs, and/or FPGAs.

In one or more examples, once the various items of executable code are generated in Step 318, the program embodied in the program code received in Step 302 may be executed on a computing device that includes various heterogeneous processors. Using the above-described method 300, development time and complexity of writing and deploying program code may be improved, as the program code need not focus on the details of executing code on different processor types, other than to include simple annotations as to the type of processor that a particular portion of the code is intended for. Additionally, program code need not explicitly set forth type and shape information, thereby further improving development time and complexity of code writing. Techniques disclosed herein may thus increase code portability and reusability across computing device platforms having different types of processors.

Figure 4:
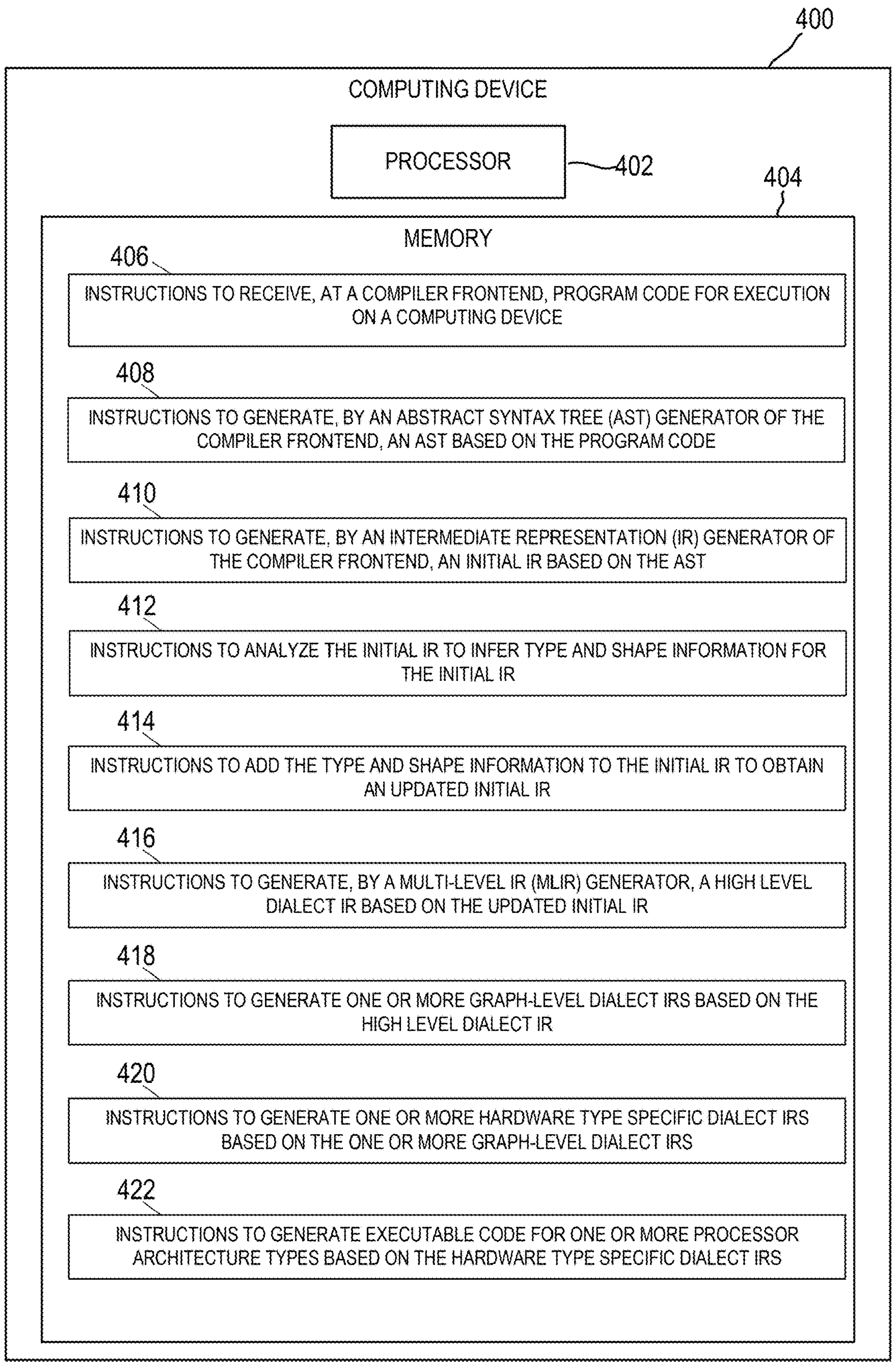
FIG. 4 illustrates a block diagram of a computing device 400, in accordance with one or more examples disclosed herein.

FIG. 4 illustrates a block diagram of a computing device 400, in accordance with one or more examples disclosed herein. The computing device 400 is an example of the various computing devices (e.g., the computing devices 100 of FIG. 1) described above and/or of the computing device 500, described below. As discussed above in the descriptions of FIG. 1, FIG. 2, and FIG. 3, the computing device 400 may be used to implement all or any portion of the various components shown in FIG. 1 and FIG. 2, and described above, such as, for example, the compiler framework 102 of FIG. 1, the program code receiver 104 of FIG. 1, the compiler frontend 106 of FIG. 1, the MLIR generator 108 of FIG. 1, the pass manager 116 of FIG. 1, the IR repository 110 of FIG. 1, the final compiler tools of FIG. 1, the compiler frontend 200 of FIG. 2, the AST generator 202 of FIG. 2, the IR generator 204 of FIG. 2, and/or the type and shape analyzer 206 of FIG. 2. The computing device 400 may include heterogeneous processors (e.g., the heterogeneous processors 114 of FIG. 1) and/or be operatively connected to one or more other computing devices that include all or any portion of such heterogeneous processors.

The computing device 400 may include one or more processors 402 and memory 404. The memory 404 may include a non-transitory computer-readable medium that stores programming for execution by one or more of the one or more processors 402. In this implementation, one or more modules within the computing device 400 may be partially or wholly embodied as software for performing any functionality described in this disclosure. The computing device 400 may be, for example, configured to perform the method shown in FIG. 3 and described above, by executing instructions included in the memory 404 and executed by the one or more processors 402.

For example, the memory 404 may include instructions 406 to receive, at a compiler frontend, program code for execution on a computing device (e.g., as described above in reference to Step 302 of FIG. 3).

For example, the memory 404 may include instructions 408 to generate, by an AST generator of the compiler frontend, an AST based on the program code (e.g., as described above in reference to Step 304 of FIG. 3).

For example, the memory 404 may include instructions 410 to generate, by an IR generator of the compiler frontend, an initial IR based on the AST (e.g., as described above in reference to Step 306 of FIG. 3).

For example, the memory 404 may include instructions 412 to analyze the initial IR to infer type and shape information for the initial IR (e.g., as described above in reference to Step 308 of FIG. 3).

For example, the memory 404 may include instructions 414 to add the type and shape information to the initial IR to obtain an updated initial IR (e.g., as described above in reference to Step 310 of FIG. 3).

For example, the memory 404 may include instructions 416 to generate, by a MLIR generator, a high level dialect IR based on the updated initial IR (e.g., as described above in reference to Step 312 of FIG. 3).

For example, the memory 404 may include instructions 418 to generate one or more graph-level dialect IRs based on the high level dialect IR (e.g., as described above in reference to Step 314 of FIG. 3).

For example, the memory 404 may include instructions 420 to generate one or more hardware type specific dialect IRs based on the one or more graph-level dialect IRs (e.g., as described above in reference to Step 316 of FIG. 3).

For example, the memory 404 may include instructions 422 to generate executable code for one or more processor architecture types based on the hardware type specific dialect IRs (e.g., as described above in reference to Step 318 of FIG. 3).

FIG. 5 illustrates a block diagram of a computing device, in accordance with one or more examples of this disclosure. As discussed above, examples described herein may be implemented using computing devices, and the computing device 500 shown in FIG. 5 may be such a computing device. For example, all or any portion of the components shown in FIG. 1 (the compiler framework 102 of FIG. 1, the program code receiver 104 of FIG. 1, the compiler frontend 106 of FIG. 1, the MLIR generator 108 of FIG. 1, the pass manager 116 of FIG. 1, the IR repository 110 of FIG. 1, the final compiler tools of FIG. 1) and FIG. 2 (e.g., the compiler frontend 200 of FIG. 2, the AST generator 202 of FIG. 2, the IR generator 204 of FIG. 2, and/or the type and shape analyzer 206 of FIG. 2) may be implemented, at least in part using the computing device 500, and may include all or any portion of the components of the computing device 500 shown in FIG. 5 and described below. Additionally, all or any portion of the method shown in FIG. 3 may be performed using one or more computing devices, such as the computing device 500.

In one or more examples, a computing device (e.g., the computing device 500) is any device, portion of a device, or any set of devices capable of electronically processing instructions and may include, but is not limited to, any of the following: one or more processors (e.g. components that include circuitry) (e.g., the processor 502), memory (e.g., random access memory (RAM)) (not shown), input and output device(s) (e.g., the non-persistent storage 506), non-volatile storage hardware (e.g., solid-state drives (SSDs), persistent memory (Pmem) devices, hard disk drives (HDDs) (not shown)), one or more physical interfaces (e.g., network ports, storage ports) (e.g., the persistent storage 506), any number of other hardware components (not shown), and/or any combination thereof. As used herein, a processor may be any component that can be configured to execute operations, processes, threads, and the like. Examples of a processor include, but are not limited to, central processing units (CPUs), multi-core CPUs, application-specific integrated circuits (ASICs), accelerators (e.g., graphics processing units (GPUs)), and field programmable gate arrays (FPGAs). Other examples of processor types may be included in the computing device 500 without departing from the scope of examples disclosed herein. In some examples, a computing device (e.g., the computing device 500) may include any number of heterogeneous processors (e.g., the heterogeneous processors 114 of FIG. 1).

The computing device 500 may include a communication interface 512 (e.g., Bluetooth interface, infrared interface, network interface, optical interface, any other type of communication interface), input devices 510, output devices 508, and numerous other elements (not shown) and functionalities. Each of these components is described below.

In one or more examples, the computer processor(s) 502 may be an integrated circuit for processing instructions. For example, the computer processor(s) may be one or more cores or micro-cores of a processor. The processor 502 may be a general-purpose processor configured to execute program code included in software executing on the computing device 500. The processor 502 may be a special purpose processor where certain instructions are incorporated into the processor design. The processor 502 may be an application specific integrated circuit (ASIC), a graphics processing unit (GPU), a data processing unit (DPU), a tensor processing units (TPU), an associative processing unit (APU), a vision processing units (VPU), a quantum processing units (QPU), and/or various other processing units that use special purpose hardware (e.g., field programmable gate arrays (FPGAs), System-on-a-Chips (SOCs), digital signal processors (DSPs)). Although only one processor 502 is shown in FIG. 5, the computing device 500 may include any number of processors without departing from the scope of examples disclosed herein.

The computing device 500 may also include one or more input devices 510, such as a touchscreen, keyboard, mouse, microphone, touchpad, electronic pen, motion sensor, or any other type of input device. The input devices 510 may allow a user to interact with the computing device 500. In one or more examples, the computing device 500 may include one or more output devices 508, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) 502, non-persistent storage 504, and persistent storage 506. Many different types of computing devices exist, and the aforementioned input and output device(s) may take other forms. In some instances, multimodal systems can allow a user to provide multiple types of input/output to communicate with the computing device 500.

Further, the communication interface 512 may facilitate connecting the computing device 500 to a network (not shown) (e.g., a local area network (LAN), a wide area network (WAN) such as the Internet, mobile network, or any other type of network) and/or to another device, such as another computing device. The communication interface 512 may perform or facilitate receipt and/or transmission of wired or wireless communications using wired and/or wireless transceivers of any type and/or technology. Examples include, but are not limited to, those making use of an audio jack/plug, a microphone jack/plug, a universal serial bus (USB) port/plug, an Apple® Lightning® port/plug, an Ethernet port/plug, a fiber optic port/plug, a proprietary wired port/plug, a Bluetooth® wireless signal transfer, a BLE wireless signal transfer, an IBEACON® wireless signal transfer, an RFID wireless signal transfer, near-field communications (NFC) wireless signal transfer, dedicated short range communication (DSRC) wireless signal transfer, 802.11 WiFi wireless signal transfer, WLAN signal transfer, Visible Light Communication (VLC), Worldwide Interoperability for Microwave Access (WiMAX), IR communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 512 may also include one or more Global Navigation Satellite System (GNSS) receivers or transceivers that are used to determine a location of the computing device 500 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

The term computer-readable medium includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as CD or DVD, flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, and the like may be passed, forwarded, or transmitted via any suitable means including memory sharing, message passing, token passing, network transmission, or the like.

All or any portion of the components of the computing device 500 may be implemented in circuitry. For example, the components can include and/or can be implemented using electronic circuits or other electronic hardware, which can include one or more programmable electronic circuits (e.g., microprocessors, GPUs, DSPs, FPGAs, CPUs, CAMs, and/or other suitable electronic circuits), and/or can include and/or be implemented using computer software, firmware, or any combination thereof, to perform the various operations described herein. In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

In the above description, numerous details are set forth as examples described herein. It will be understood by those skilled in the art (who also have the benefit of this disclosure) that one or more examples described herein may be practiced without these specific details, and that numerous variations or modifications may be possible without departing from the scope of the examples described herein. Certain details known to those of ordinary skill in the art may be omitted to avoid obscuring the description.

Specific details are provided in the description above to provide a thorough understanding of the aspects and examples provided herein. However, it will be understood by one of ordinary skill in the art that the aspects and examples may be practiced without these specific details. For clarity of explanation, in some instances the present technology may be presented as including functional blocks that may include devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects of examples disclosed herein.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not included in a drawing. A process may correspond to a method, a function, a procedure, a subroutine, a subprogram, and the like. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, and the like. Examples of computer-readable media that may be used to store instructions, information used, and/or information created during methods according to described examples include magnetic or optical disks, flash memory, USB devices provided with non-volatile memory, networked storage devices, and so on.

In the above description of the figures, any component described with regard to a figure, in various examples described herein, may be equivalent to one or more same or similarly named and/or numbered components described with regard to any other figure. For brevity, descriptions of these components may not be repeated with regard to each figure. Thus, each and every example of the components of each figure is incorporated by reference and assumed to be optionally present within every other figure having one or more same or similarly named and/or numbered components. Additionally, in accordance with various examples described herein, any description of the components of a figure is to be interpreted as an optional example, which may be implemented in addition to, in conjunction with, or in place of the examples described with regard to a corresponding one or more same or similarly named and/or numbered component in any other figure.

Throughout the application, ordinal numbers (e.g., first, second, third) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While examples discussed herein have been described with respect to a limited number of examples, those skilled in the art, having the benefit of this disclosure, will appreciate that other examples can be devised which do not depart from the scope of examples as disclosed herein. Accordingly, the scope of examples described herein should be limited only by the attached claims.

What is claimed is:

1. A system, comprising:

one or more processors; and one or more non-transitory computer readable media storing instructions which, when executed by the one or more processors, cause the one or more processors to:

receive, at a compiler frontend, program code for execution on a computing device;

generate, by an abstract syntax tree (AST) generator of the compiler frontend, an AST based on the program code;

generate, by an intermediate representation (IR) generator of the compiler frontend, an initial IR based on the AST;

analyze the initial IR to infer type and shape information for the initial IR;

add the type and shape information to the initial IR to obtain an updated initial IR;

generate, by a multi-level IR (MLIR) generator, a high level dialect IR based on the updated initial IR;

generate two or more graph-level dialect IRs based on the high level dialect IR;

generate two or more hardware type specific dialect IRs based on the two or more graph-level dialect IRs;

generate executable code for two or more processor architecture types based on the two or more hardware type specific dialect IRs;

execute a first portion of the executable code on a first processor of a first processor architecture type of the two or more processor architecture types; and execute a second portion of the executable code on a second processor of a second processor architecture type of the two or more processor architecture types.

2. The system of claim 1, wherein, to generate the two or more hardware type specific dialect IRs based on the two or more graph-level dialect IRs, the instructions, when executed by the one or more processors, further cause the one or more processors to determine that the program code includes two or more annotations, each specifying a particular processor architecture type for a corresponding portion of the program code.

3. The system of claim 2, wherein the particular processor architecture type is one of a central processing unit (CPU), a graphics processing unit (GPU), a field programmable gate array (FPGA), or a quantum processing unit (QPU).

4. The system of claim 2, wherein:

the program code includes the two or more annotations, and at least two annotations of the two or more annotations specify different processor architecture types.

5. The system of claim 1, wherein, to generate the executable code, the instructions, when executed by the one or more processors, further cause the one or more processors to generate two or more LLVM IRs based on the two or more hardware type specific dialect IRs.

6. The system of claim 5, wherein, to generate the executable code, the instructions, when executed by the one or more processors, further cause the one or more processors to compile the two or more LLVM IRs.

7. The system of claim 1, wherein the computing device comprises a heterogeneous architecture that includes at least two processor architecture types.

8. A computer-implemented method, comprising:

receiving, at a compiler frontend, program code for execution on a computing device;

generating, by an abstract syntax tree (AST) generator of the compiler frontend, an AST based on the program code;

generating, by an intermediate representation (IR) generator of the compiler frontend, an initial IR based on the AST;

analyzing the initial IR to infer type and shape information for the initial IR;

adding the type and shape information to the initial IR to obtain an updated initial IR;

generating, by a multi-level IR (MLIR) generator, a high level dialect IR based on the updated initial IR;

generating two or more graph-level dialect IRs based on the high level dialect IR;

generating two or more hardware type specific dialect IRs based on the two or more graph-level dialect IRs;

generating executable code for two or more processor architecture types based on the two or more hardware type specific dialect IRs;

executing a first portion of the executable code on a first processor of a first processor architecture type of the two or more processor architecture types; and executing a second portion of the executable code on a second processor of a second processor architecture type of the two or more processor architecture types.

9. The computer-implemented method of claim 8, wherein generating the two or more hardware type specific dialect IRs based on the two or more graph-level dialect IRs comprises determining that the program code includes two or more annotations, each specifying a particular processor architecture type for a corresponding portion of the program code.

10. The computer-implemented method of claim 9, wherein the particular processor architecture type is one of a central processing unit (CPU), a graphics processing unit (GPU), a field programmable gate array (FPGA), or a quantum processing unit (QPU).

11. The computer-implemented method of claim 9, wherein:

the program code includes the two or more annotations, and at least two annotations of the two or more annotations specify different processor architecture types.

12. The computer-implemented method of claim 8, wherein generating the executable code comprises generating two or more LLVM IRs based on the two or more hardware type specific dialect IRs.

13. The computer-implemented method of claim 12, wherein the generating of the executable code further comprises compiling the two or more LLVM IRs.

14. The computer-implemented method of claim 8, wherein the computing device comprises a heterogeneous architecture that includes at least two processor architecture types.

15. A non-transitory computer-readable medium storing programming for execution by one or more processors, the programming comprising instructions to:

receive, at a compiler frontend, program code for execution on a computing device;

generate, by an abstract syntax tree (AST) generator of the compiler frontend, an AST based on the program code;

generate, by an intermediate representation (IR) generator of the compiler frontend, an initial IR based on the AST;

analyze the initial IR to infer type and shape information for the initial IR;

add the type and shape information to the initial IR to obtain an updated initial IR;

generate, by a multi-level IR (MLIR) generator, a high level dialect IR based on the updated initial IR;

generate two or more graph-level dialect IRs based on the high level dialect IR;

generate two or more hardware type specific dialect IRs based on the two or more graph-level dialect IRs;

generate executable code for two or more processor architecture types based on the two or more hardware type specific dialect IRs;

execute a first portion of the executable code on a first processor of a first processor architecture type of the two or more processor architecture types; and execute a second portion of the executable code on a second processor of a second processor architecture type of the two or more processor architecture types.

16. The non-transitory computer-readable medium of claim 15, wherein, to generate the two or more hardware type specific dialect IRs based on the two or more graph-level dialect IRs, the instructions further include additional instructions to determine that the program code includes two or more annotations, each specifying a particular processor architecture type for a corresponding portion of the program code.

17. The non-transitory computer-readable medium of claim 16, wherein the particular processor architecture type is one of a central processing unit (CPU), a graphics processing unit (GPU), a field programmable gate array (FPGA), or a quantum processing unit (QPU).

18. The non-transitory computer-readable medium of claim 16, wherein:

the program code includes the two or more annotations, and at least two annotations of the two or more annotations specify different processor architecture types.

19. The non-transitory computer-readable medium of claim 15, wherein, to generate the executable code, the instructions further include additional instructions to:

generate two or more LLVM IRs based on the two or more hardware type specific dialect IRs; and compile the two or more LLVM IRs.

20. The non-transitory computer-readable medium of claim 15, wherein the computing device comprises a heterogeneous architecture that includes at least two processor architecture types.

* * * * *